(12) United States Patent
Jaeger (10) Patent No.: US 9,387,545 B2
(45) Date of Patent: Jul. 12, 2016

(54) HONING METHOD WITH CENTERING OF A WORKPIECE ON A ROLLING VERIFICATION STATION (71) Applicant: FELSOMAT GmbH & Co. KG, Koenigsbach-Stein (DE)

(72) Inventor: Helmut F. Jaeger, Koenigsbach-Stein (DE)

(73) Assignee: FELSOMAT GMBH & CO KG., Koenigsbach-Stein (DE)

( * ) Notice: Subject to any disclaimer, the term of this patent is extended or adjusted under 35 U.S.C. 154(b) by 195 days.

(21) Appl. No.: 14/214,785

(22) Filed: Mar. 15, 2014

(65) Prior Publication Data
US 2014/0199920 A1 Jul. 17, 2014

Related U.S. Application Data (63) Continuation of application No. PCT/EP2012/067955, filed on Sep. 13, 2012.

(30) Foreign Application Priority Data

Sep. 16, 2011 (DE) .......................... 10 2011 082 868

(51) Int. Cl.
| | |
|---|---|
| *B23F 19/05* | (2006.01) |
| *B24B 49/10* | (2006.01) |
| *B24B 33/08* | (2006.01) |
| *B23F 23/00* | (2006.01) |
| *B23F 23/12* | (2006.01) |
| *B24B 33/06* | (2006.01) |

(52) U.S. Cl.
CPC .............. *B23F 19/05* (2013.01); *B23F 23/006* (2013.01); *B23F 23/1218* (2013.01); *B24B 33/06* (2013.01); *B24B 33/081* (2013.01); *B24B 49/10* (2013.01)

(58) Field of Classification Search
CPC ...... B23F 19/045; B23F 19/05; B23F 19/057; B23F 5/10; B23F 23/0016; B23F 23/1218; B24B 33/06; B24B 33/081; B24B 49/10
See application file for complete search history.

(56) References Cited

U.S. PATENT DOCUMENTS

| | | | |
|---|---|---|---|
| 5,174,070 A | 12/1992 | Loesch et al. | |
| 6,840,720 B2 * | 1/2005 | Mall ........................ | B23F 19/00 409/40 |
| 9,186,738 B2 * | 11/2015 | Mall ........................ | B23F 23/04 |

(Continued)

FOREIGN PATENT DOCUMENTS

| | | |
|---|---|---|
| DE | 43 17 306 A1 | 10/1993 |
| DE | 44 13 229 A1 | 12/1994 |

(Continued)

*Primary Examiner* — Timothy V Eley
(74) *Attorney, Agent, or Firm* — Hackler Daghighian & Martino (57) ABSTRACT

A method for honing a workpiece includes moving the workpiece onto an intermediate retention member which is rotatable about a vertical workpiece axis. Then, the workpiece is brought into a rolling engagement with a teaching wheel. An angular transfer position of the workpiece is established by the rotary sensor of the teaching wheel retention member. Next, the workpiece is transferred from the intermediate retention member onto a workpiece spindle, where the workpiece is retained onto the workpiece spindle. Then, the workpiece goes through a honing process by bringing the workpiece into a synchronized rolling engagement with a honing tool by utilizing the angular transfer position of the workpiece, thereby eliminating a separate centering step of the workpiece.

17 Claims, 5 Drawing Sheets

(56) References Cited

U.S. PATENT DOCUMENTS

| | | |
|---|---|---|
| 2005/0055836 A1 | 3/2005 | Graf et al. |
| 2005/0186886 A1 | 8/2005 | Wirz |
| 2014/0199925 A1* | 7/2014 | Jaeger ................ B23F 23/1281 451/294 |

FOREIGN PATENT DOCUMENTS

| | | |
|---|---|---|
| DE | 43 21 448 A1 | 1/1995 |
| DE | 198 57 592 A1 | 6/2000 |
| DE | 200 05 299 U1 | 8/2000 |
| DE | 199 28 500 A1 | 12/2000 |
| DE | 699 01 004 T2 | 10/2002 |
| DE | 10 2004 009 393 A1 | 9/2005 |
| DE | 10 2005 024 127 A1 | 11/2006 |
| DE | 10 2006 019 325 B3 | 9/2007 |
| DE | 10 2007 030 955 B4 | 4/2009 |
| DE | 10 2009 059 331 A1 | 8/2010 |
| DE | 20 2011 051 332 U1 | 12/2011 |
| EP | 0 519 118 A1 | 12/1992 |
| EP | 2011596 A2 | 1/2009 |
| JP | S58 149129 A | 9/1983 |
| JP | H04 189418 A | 7/1992 |

\* cited by examiner

HONING METHOD WITH CENTERING OF A WORKPIECE ON A ROLLING VERIFICATION STATION

CROSS-REFERENCE TO RELATED APPLICATIONS

This continuation application claims priority to PCT/EP2012/067955 filed on Sep. 13, 2012 which has published as WO 2013/037890 A2 and also the German application number 10 2011 082 868.0 filed on Sep. 16, 2011, the contents of which are fully incorporated herein with these references.

DESCRIPTION

1. Field of the Invention

The invention generally relates to a method for the honing processing operation of a workpiece. More particularly, the present invention relates to a toothed wheel where the workpiece is first moved onto an intermediate retention member, then the workpiece is transferred from the intermediate retention member having a defined angular position onto a workpiece spindle, and then the workpiece retained on the workpiece spindle is brought into engagement with a honing tool on a tool spindle and subjected to a honing processing operation.

2. Background of the Invention

During a honing operation, in the case of a toothed workpiece, such as a toothed wheel or a gear mechanism, the tooth flanks are rolled on a honing tool. The honing tool is generally a so-called honing ring, which in most cases comprises a ceramic material or is coated with a ceramic material. Material is thereby removed from the tooth flanks of the workpiece. The honing ring has a circular basic form and itself has tooth flanks which are directed radially inwards.

During the rolling of the workpiece and honing ring, the honing ring is rotated by means of a tool spindle. The workpiece is also rotated by means of a workpiece spindle. In this instance, the workpiece spindle rotates at high speeds up to the order of magnitude of a few thousand rpm. Since an over-dimension in the order of magnitude of only 15-50 μm is removed during the honing operation, the honing ring and the workpiece must be very precisely orientated with respect to each other and synchronized during the honing processing operation.

For control of the honing process, it is important to know the position of the teeth or the tooth flanks on the workpiece and the honing tool when the workpiece is introduced into the honing tool. During this introduction, the spindles are typically already accelerated to the speeds provided for the honing process. In the case of incorrect fitting, for instance, if a tooth of the workpiece were not to meet a hole on the honing tool, but instead a tooth of the honing tool, the workpiece and also the honing tool (which is generally even more expensive to replace) would be significantly damaged.

In the prior art, there are typically provided on the workpiece spindle and on the tool spindle rotary sensors by means of which not only the rotation speeds, but also the absolute positions of the spindles can be monitored. After a single calibration after the honing tool has been installed on the tool spindle, the position of the tooth flanks of the honing tool can be established by means of the rotary sensor and be used for the control operation. With regard to the workpiece spindle, a new calibration is required in principle each time a new workpiece has been gripped. For this purpose, an inductive sensor is typically used on the workpiece spindle, by means of which sensor teeth which move past in the immediate vicinity thereof can be recognized. For this calibration, the workpiece must be rotated on the workpiece spindle for a given length of time close to the sensor before the beginning of the honing processing operation.

During such a calibration of the workpiece spindle, it cannot be used for the honing processing operation, whereby non-productive times which increase the phase time on a honing machine occur.

For different types of machine tools, it has been proposed to make better use of a tool by the use of two tool spindles on which the tool is used alternately, cf., for example, DE 10 2006 019 325 B3. Auxiliary processes on a workpiece spindle such as a workpiece change can thereby be carried out parallel with the main production time, that is to say, during a processing operation on the other workpiece spindle with the tool. However, the use of two workpiece spindles makes the machine tool larger and more expensive.

In DE 10 2007 030 955 B4, it is proposed that a workpiece first be rotated by means of an indexing spindle into an angular position which is suitable for a subsequent honing processing operation and then be transferred to a workpiece spindle by means of a pivotable carrier, on which two gripping members are formed. Subsequently, the workpiece spindle is advanced to the honing ring. In order to ensure a defined angular position when the workpieces are transferred to the workpiece spindle, the workpieces are retained in specific clamping devices, which have axial projections which are directed radially inwards.

However, for clamping the workpieces on the clamping devices and subsequently releasing the workpieces, additional processes must be configured. The indexing spindle, the pivotable carrier and the two gripping members further constitute significant complexity in terms of equipment. In addition, the monitoring of the precise angular positions in this method is on the whole relatively complex.

An object of the invention is to provide a method for the honing processing operation of a workpiece, wherein the calibration (also called centering) of the workpiece spindle with respect to a retained workpiece can be carried out in a simple and time-saving manner. The present invention fulfills these needs and provides other related advantages.

SUMMARY OF THE INVENTION

The object of the present invention is achieved by a method of the type mentioned in the introduction which is characterized in that, after step a) the workpiece on the intermediate retention member is brought into engagement with a teaching wheel on a teaching wheel retention member and is rolled thereon in order to measure the workpiece, and in that, before or during step b) an angular transfer position of the workpiece is established by outputting a rotary sensor of the teaching wheel retention member.

According to the invention, the calibration (centering) of the workpiece spindle is integrated in a rolling verification operation during which the workpiece is rolled on a teaching wheel (also referred to as a master wheel). Workpieces whose over-dimensions are too large for the honing processing operation are usually identified with the rolling verification operation.

The teaching wheel is typically selected to be a generally ground workpiece which is defect-free to the greatest possible extent and which is of the same type as the workpiece to be measured (alternatively, the teaching wheel may also be of a different type, for instance, having a different number of teeth from the workpiece). The teaching wheel engages in the tooth profile of the workpiece to be verified during rolling, whereby a precisely defined angular relationship is produced. Generally, the angular relationship is an offset by half of the center distance of two adjacent teeth.

The (absolute) angular position of the workpiece on the intermediate retention member can then be established from the output (absolute) angular position of the teaching wheel retention member (a slip-free engagement of the teaching wheel and the workpiece being taken as a prerequisite) by means of the rotary sensor of the teaching wheel retention member after calibration of the teaching wheel retention member. Repeated calibration is necessary in principle only after the teaching wheel has been changed (for instance, in the event of retooling to a different workpiece type).

The calibration of the teaching wheel retention member may be in two steps (that is to say, first, the angular position of the securely mounted teaching wheel is derived from the angular position of the teaching wheel retention member and then the angular position of the workpiece which is in engagement is derived from the angular position of the teaching wheel via the workpiece geometry) or may, however, be in one step (the angular position of the workpiece in engagement is derived directly from the angular position of the teaching wheel retention member).

It should be noted that, after the calibration of the teaching wheel retention member and the teaching wheel has been carried out, the angular position of the teaching wheel retention member (which substantially comprises a shaft as a rotating component) is typically expressed for the sake of simplicity as an angular position of the teaching wheel without any explicit mention of the calibration.

When the workpiece is transferred from the intermediate retention member to the workpiece spindle, the angular position is then (preferably) not changed or only changed in a defined, known manner according to the invention so that the angular position of the tooth flanks of the workpiece on the workpiece spindle is (preferably) known or can readily be calculated after the transfer.

By establishing the angular transfer position of the workpiece with the rotary sensor of the teaching wheel retention member at the end of the rolling verification operation, the centering of the workpiece in the verification station can be carried out parallel with production time (that is to say, while a different workpiece is being processed with the honing tool) so that the phase time of the honing machine is reduced in comparison with a separate centering operation on the workpiece spindle with a sensor (for instance, an inductivity sensor). According to the invention, it is not necessary to center the workpiece on the workpiece spindle with a sensor (for instance, an inductivity sensor), which would delay the actual honing processing.

It should be noted that the workpiece spindle and the tool spindle each have rotary sensors for tracking the angular positions during the subsequent rotations of the spindles, in particular during the honing processing. The signals (or information) thereof is/are evaluated by an electronic control device and evaluated for the correct synchronization of the spindles during the honing processing.

The teaching wheel (or teaching wheel retention member) and workpiece (or intermediate retention member) are orientated parallel with each other. In order to measure the workpiece, the teaching wheel retention member (alternatively, the intermediate retention member) is typically movably supported in a radial direction, the displacement position of the teaching wheel retention member also being tracked during the rolling movement. It is thereby possible to determine the axial spacing or the over-dimension of the workpiece. The teaching wheel preferably adjoins the respective tooth of the workpiece during rolling with two tooth flanks (two-flank rolling verification, in the case of slip-free mutual engagement), whereby a particularly precise centering operation can be carried out.

In a particularly advantageous variant of the method according to the invention, the angular position of the teaching wheel retention member is output with the rotary sensor, whilst the teaching wheel is still in engagement with the workpiece, but the workpiece has already been gripped in a rotationally secure manner in the context of the transfer. It is thereby impossible for an angular position change of the workpiece, which change has been imparted to the workpiece by an access (for instance, by the workpiece spindle itself during the pick-up method) to distort the centering operation. Alternatively, it is also possible for the teaching wheel and the workpiece to be moved out of engagement before the transfer in step b), for instance, in order not to impede the transfer. In this case, the method must be carried out in such a manner that a non-defined angular position change of the workpiece cannot be brought about during the transfer. For this purpose, for example, intermediate fixing operations of the workpiece may be carried out.

A method variant is particularly preferred in which, in step b), the transfer from the intermediate retention member is carried out directly to the workpiece spindle, in particular with the workpiece spindle being moved by a motor during the transfer. This procedure is also referred to as the "pick-up" method where it is particularly fast and angular position errors resulting from intermediate transfer operations are impossible. Alternatively, it is also possible to carry out an indirect transfer, for example, with a gripper which is interposed and which takes the workpiece from the intermediate retention member and passes it to the workpiece spindle. In this instance, the information concerning the angular position of the workpiece must be retained.

A variant is advantageous in which a decision is taken on the basis of the result of the measurement of the workpiece after step a) as to whether the workpiece is permitted or rejected for the honing processing operation in step c). Unnecessary processing of poor workpieces is thereby prevented. It is particularly possible to use the fact concerning whether the maximum over-dimension of the workpiece exceeds a limit value (for instance, 50 μm) as a decision criterion.

In a particularly preferred variant of the method according to the invention, angle-dependent dimensional information concerning the workpiece is established in the context of the measurement of the workpiece, the angular position of the workpiece also being tracked during rolling by means of the rotary sensor of the teaching wheel retention member. In particular, the over-dimension (in accordance with the axial spacing) may be retained as a function of the angle (in a plane perpendicular to the workpiece rotation axis with respect to a freely selectable zero angle direction). The angular resolution should correspond to at least the number of teeth and preferably to at least the number of tooth flanks (two flanks per tooth). It is thereby possible to identify particular features (defects) of the workpiece for subsequent special processing (in particular for special, subsequent honing processing). Furthermore, it is also possible to establish the cumulative pitch and roundness in accordance with the angle.

A development of the above-mentioned variant is also particularly preferable which makes provision for the angle-dependent dimension information to be transferred to an electronic control device which controls the honing processing operation in step c), and for the electronic control device to evaluate the angle-dependent dimension information for controlling the honing processing operation of the workpiece in step c). The honing processing can thereby be adapted to the particular features of the individual workpiece.

In an advantageous manner, in step c), the relative axial spacing and/or the relative rotation position of the workpiece on the workpiece spindle and the honing tool on the tool spindle are tracked by means of the electronic control device during a revolution of the workpiece in accordance with the angle-dependent dimension information. It is thereby possible to selectively correct or change defects or dimensions of the workpiece which vary over the periphery of the workpiece, in particular a slightly non-circular shape. For example, the axial spacing of the tool spindle and the workpiece spindle can always be reduced if an angular range of the workpiece having a particularly high over-dimension is introduced into the contact region with the honing tool in order initially to remove that particularly high over-dimension to such an extent that it corresponds to the over-dimension in the remaining angular ranges of the workpiece. Subsequently, the honing processing operation is extended to the entire angular range (that is to say, to the entire periphery) of the workpiece. In the context of this variant, the electronic control device typically changes the axial spacing and/or the rotation position of the workpiece and the honing tool periodically with the rotational frequency of the workpiece.

A method variant is further preferable in which the workpiece is retained in a freely rotatable manner on the intermediate retention member and the teaching wheel is motor-driven during the rolling for measuring the workpiece. This procedure has been found to be advantageous in practice. Alternatively, it is also possible to drive the workpiece on the intermediate retention member by motor.

A method variant is also preferable which makes provision for the steps a) to c) to be repeated on different workpieces and, at least in the case of some of the workpieces after the honing processing operation, d) for the workpiece to be brought back to the intermediate retention member, to be brought into engagement with the teaching wheel again and to be rolled thereon in order to measure the workpiece and e) in accordance with the result of the measurement of step d), either another workpiece is subjected to a honing processing operation in accordance with the steps a) to c) or the honing tool is changed. Typically, after a new honing tool has been installed, processing of a relatively large number of workpieces (for example, 200) is initially carried out without any control measurement according to step d) and subsequently a control measurement is carried out after a relatively small number of workpieces (for example, 20) until a control measurement in step d) produces a critical processing quality. Subsequently, the honing tool is changed. A good processing quality can be ensured with this variant with optimum utilization of the service-life of the honing tool.

The scope of the present invention also includes a honing machine, in particular for carrying out an above-described method according to the invention, comprising: a workpiece spindle for a workpiece, in particular a toothed wheel; a tool spindle for a honing tool, in particular a ceramic or ceramic-coated honing ring; and a verification station at which an intermediate retention member for the workpiece and a teaching wheel retention member for a teaching wheel are constructed, the teaching wheel retention member being provided with a rotary sensor for establishing the angular position of the teaching wheel retention member. At any time, the (absolute) angular position of the teaching wheel retention member or the teaching wheel can be established with the rotary sensor. It is thereby possible to derive the angular position of a workpiece in engagement with the teaching wheel; this information can be used in a time-saving manner to center the workpiece on the workpiece spindle. It should be noted that the engagement no longer needs to exist at the output time of the rotary sensor. The verification station is separate from the processing station (that is to say, the workpiece spindle and the tool spindle) according to the invention.

In a preferred embodiment of the honing machine according to the invention, the honing machine has an electronic control device which is constructed to establish an angular position of the workpiece by outputting the rotary sensor, which angular position belongs to the output angular position of the teaching wheel retention member, and therefore to track the angular position of the workpiece during the honing processing operation after the workpiece has been transferred to the workpiece spindle. The workpiece spindle typically has an individual rotary sensor in order to track the angular position of the workpiece. The calibration is carried out indirectly by means of the rotary sensor of the teaching wheel retention member. Similarly, the tool spindle typically has an individual rotary sensor in order to track the angular position of the honing tool. Calibration is necessary only after the honing tool has been changed. In this embodiment, the centering of the workpiece can be carried out in the context of the rolling verification of the workpiece in a time-saving manner parallel with the production time on the verification station.

A development of this embodiment is particularly preferred in which the electronic control device is further constructed: to input angle-dependent dimension information about the workpiece from the relative displacement positions of the intermediate retention member and the teaching wheel retention member and the angular positions of the teaching wheel retention member while the workpiece is rolling on the teaching wheel; and to track the relative axial spacing and/or the relative rotation position of the workpiece on the workpiece spindle and a honing tool on the tool spindle during a revolution of the workpiece in accordance with the angle-dependent dimension information during the honing processing operation of the workpiece. It is thereby possible to correct or change in a selective manner workpiece defects or dimensions which vary over the periphery of the workpiece, in particular a slightly non-circular shape.

Additional advantages of the invention will be appreciated from the description and the drawings. According to the invention, the features mentioned above and those set out below may also be used individually per se or together in any combination. The embodiments shown and described are not intended to be understood to be a conclusive listing but are instead of exemplary character for describing the invention.

BRIEF DESCRIPTION OF THE DRAWINGS

The invention is illustrated in the drawings and is explained in greater detail with reference to embodiments. In the drawings:

FIG. 4b shows an example of an axial spacing to be controlled of the workpiece spindle and honing ring for the workpiece measured in FIG. 4a.

DETAILED DESCRIPTION OF THE PREFERRED EMBODIMENTS

Figure 1:
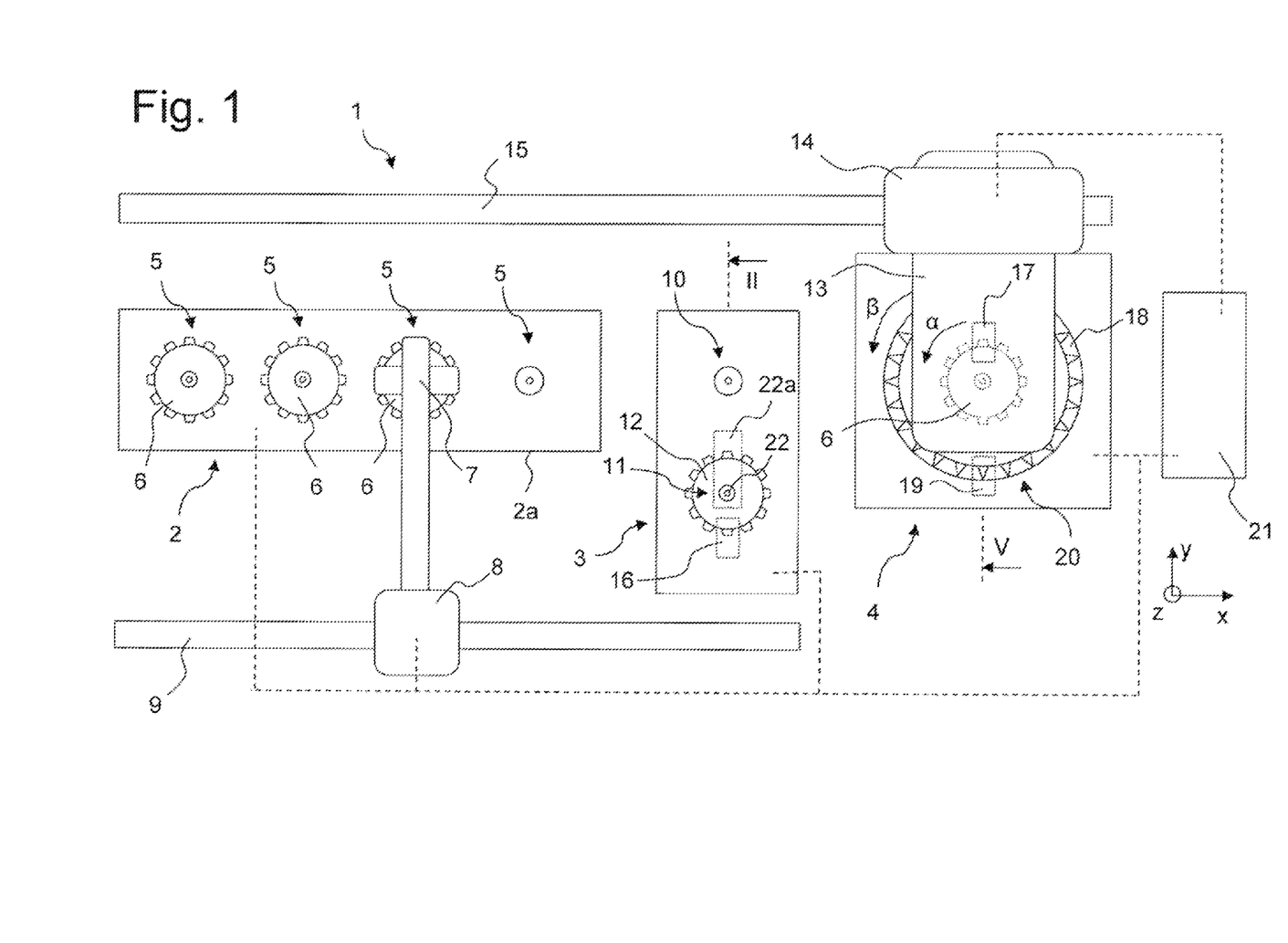
FIG. 1 is a schematic plan view of a honing machine according to the invention on which the method according to the invention for honing processing can be carried out.

FIG. 1 is an overview of an embodiment of a honing machine 1 according to the invention. In this instance, the honing machine 1 comprises a loading and unloading station 2, a verification station 3 and a processing station 4.

In the embodiment shown, four deposit locations 5 each for one workpiece 6 are configured in a frame 2a at the loading and unloading station 2. Typically, a frame 2a having four non-processed workpieces 6 is provided and the frame 2a is changed after all the workpieces 6 have been processed. In the situation shown, there are three workpieces 6 in the frame 2a, one of which is just being gripped by a gripper 7. The gripper 7 can be displaced by means of a cross type carriage 8 and a portal system 9 vertically (perpendicularly relative to the plane of the drawing, z direction) and horizontally (in the x direction) between the loading and unloading station 2 and the verification station 3. The gripper 7 will bring the gripped workpiece 6 to the verification station 3.

The verification station 3 comprises an intermediate retention member 10 for a workpiece 6 (to which the gripper 7 will bring the gripped workpiece 6) and a teaching wheel retention member 11 for a teaching wheel 12 (also referred to as a master wheel). The teaching wheel 12 can be displaced horizontally towards the intermediate retention member 10 (in the y direction), cf. the opening 22a which extends in a y direction for a shaft 22 of the teaching wheel retention member 11. In contact with a workpiece 6 on the intermediate retention member 10, the position of the teaching wheel 12 can be measured over a revolution of the teaching wheel 12 (which also corresponds to a revolution of the workpiece 6) ("rolling verification", see below in this regard). The quality of the workpiece 6 can thereby be derived. The teaching wheel 12 corresponds in terms of the type to the workpiece 6 after complete honing processing; it is required that the teaching wheel 12 not have any significant defects.

A workpiece 6 which is too poor for the honing processing provided (for instance, because of an excessive maximum over-dimension) is brought from the verification station by the gripper 7 directly back to the loading and unloading station 2. A sufficiently good workpiece 6 is gripped by a workpiece spindle 13 during the pick-up method and brought to the processing station 4. To that end, the workpiece spindle 13 can be displaced vertically (in the z direction) and horizontally (in the x direction and here also in a limited manner in the y direction for the workpiece advance in the processing station 4) with a double cross type carriage 14 and a portal system 15 between all the stations 2, 3, 4.

According to the invention, the teaching wheel retention member 11 further has a rotary sensor 16 with which the absolute rotation angle (also referred to as the absolute angular position) of the teaching wheel retention member 11 or the teaching wheel 12 can be established at any time. Calibration with respect to the teaching wheel 12 is carried out once when the teaching wheel 12 is installed. The rotation angle information is used to center a workpiece 6 on the intermediate retention member 10 (see in this regard below, in particular in FIG. 3).

A workpiece 6 (illustrated with broken lines in FIG. 1 because it is hidden by the workpiece spindle 13) brought by the workpiece spindle 13 to the processing station 4 is subjected to a honing processing operation at the processing station 4. To that end, the workpiece 6 is accelerated to a high speed on the workpiece spindle 13. The absolute angular position $\alpha$ of the workpiece 6 is tracked by means of a rotary sensor 17, where the centering information of the verification station 3 is used to that end. Similarly, a honing tool 18, in this instance a ceramic or ceramic-coated honing ring, is accelerated to a high speed in a tool spindle 20. In this instance, the absolute angular position $\beta$ of the honing tool 18 is also tracked by means of a rotary sensor 19; calibration is carried out once when the honing ring is installed.

With a rapidly rotating workpiece spindle 13 and a tool spindle 20 rotating slightly more slowly, the workpiece 6 and the honing tool 18 are brought into engagement with each other in a synchronized manner. To that end, the workpiece spindle 13 is moved towards the honing tool 18 (in this instance, in a negative y direction, downwards in FIG. 1). The movement, gripping and rotary motors of the workpiece spindle 13 and the tool spindle 20 are controlled by an electronic control device 21 which also outputs all the rotary sensor information. The electronic control device 21 further also controls the movement, gripping and rotary motors of the gripper 7 and the verification station 3. During engagement, material is removed from the workpiece 6 which constitutes the actual honing processing operation.

After the honing processing operation is complete, the workpiece 6 is brought by the workpiece spindle 13 to a free deposit location 5 of the loading and unloading station 2. Alternatively, a processed workpiece 6 may also be brought back to the intermediate retention member 10 of the verification station 3 in order to verify the processing success in the context of a repeated rolling verification operation.

Figure 2:
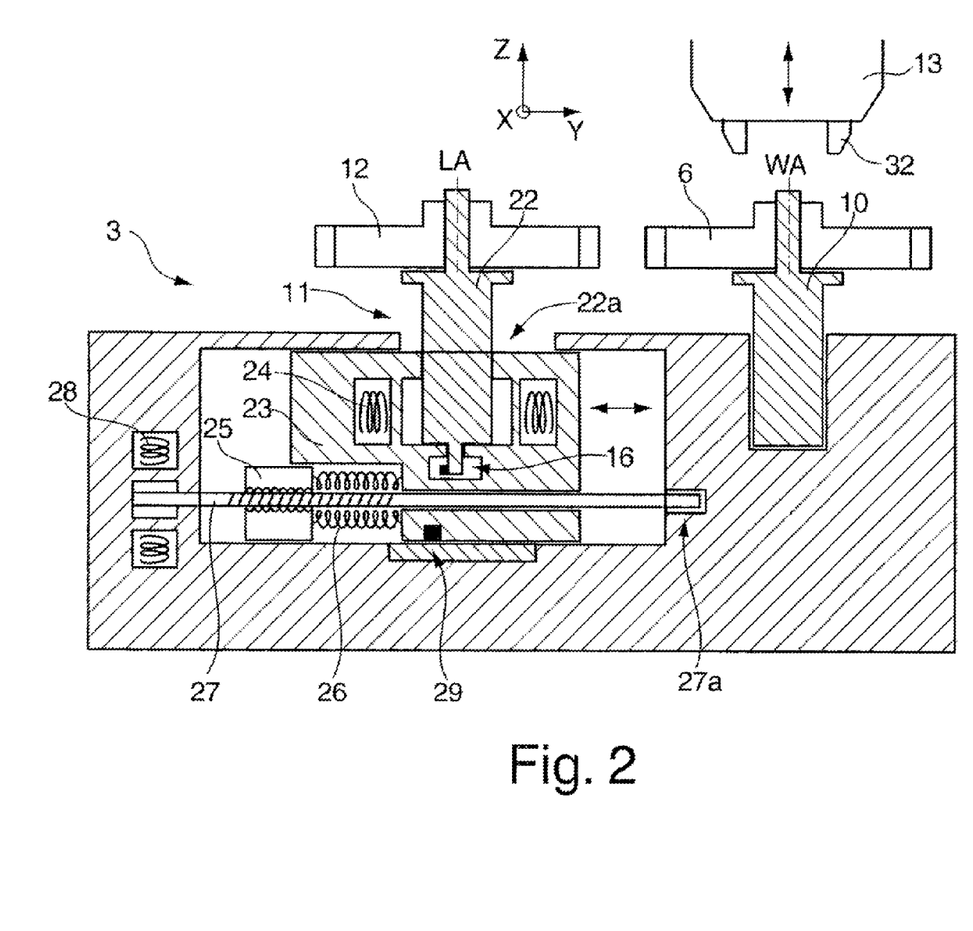
FIG. 2 is a schematic cross-section through the verification station of FIG. 1 in plane II in FIG. 1 with the teaching wheel not engaging in a workpiece.

FIG. 2 is a cross-section in the y direction of the verification station 3 of FIG. 1, with a workpiece 6 (in this instance, a toothed wheel) already being arranged on the intermediate retention member 10 in a differing manner. The workpiece 6 can be freely rotated about a vertical workpiece axis WA but is retained without play in a radial manner.

The teaching wheel 12 is arranged on the teaching wheel retention member 11. The teaching wheel 12 is fixed on the shaft 22 of the teaching wheel retention member 11 in a manner not illustrated in greater detail and can therefore rotate only together with the shaft 22. The rotation occurs about a teaching wheel axis LA which is also vertical. The shaft 22 is supported in a carriage 23 which can be displaced inside the verification station 3 horizontally in a y direction towards and away from the intermediate retention member 10. The shaft 22 projects through the elongate opening 22a out of the housing of the verification station 3. There is formed in the carriage 23 a motorized drive 24, with which a rotation of the shaft 22 can be driven. The absolute rotation position of the shaft 22 or the teaching wheel retention member 11 is tracked with the rotary sensor 16.

The carriage 23 can be displaced by means of a sliding device 25, to which the carriage 23 is connected by means of springs, in this instance helical springs 26. The sliding device 25 has an inner thread which cooperates with a threaded rod 27. By the threaded rod 27 being rotated by means of a motorized drive 28, the sliding device 25 can be displaced in the y direction. The carriage 23 which is guided in an easy-running manner in the verification station 3 is also guided by means of the helical springs 26 in principle both forwards (to the right towards the intermediate retention member 10) and backwards (to the left). The absolute displacement position of the carriage 23 is also tracked by means of a displacement transducer 29. It should be noted that the threaded rod 27 extends freely in the region of the carriage 23 in order to be able to use a bearing 27a which is opposite the motorized drive 28.

Alternatively, the drive of the carriage 23 may also be brought about by a linear motor. In this instance, the mechanical springs can be replaced by an electronic control unit. The rigidity or softness of the axis LA can then be controlled electronically.

For rolling verification, the carriage 23 is displaced to the right by means of the motorized drive 28, the threaded rod 27 and the sliding device 25 so that the teaching wheel 12 comes into engagement with the workpiece 6. Subsequently, the sliding device 25 is further displaced slightly more to the right so that the helical springs 26 are compressed. Subsequently, the sliding device 25 is retained so as to be fixed in position while the teaching wheel 12 is rotated at least once through a round angle (360°) by means of the motorized drive 24 and the shaft 22. This procedure ensures that the teaching wheel 12 (under the action of the helical springs 26) has a degree of freedom of movement to the left and to the right, by means of which the teaching wheel 12 can adjoin the workpiece 6 in a non-positive-locking manner during the rolling action, even if the workpiece 6 has variations in over-dimensions over the rotation action.

Figure 3:
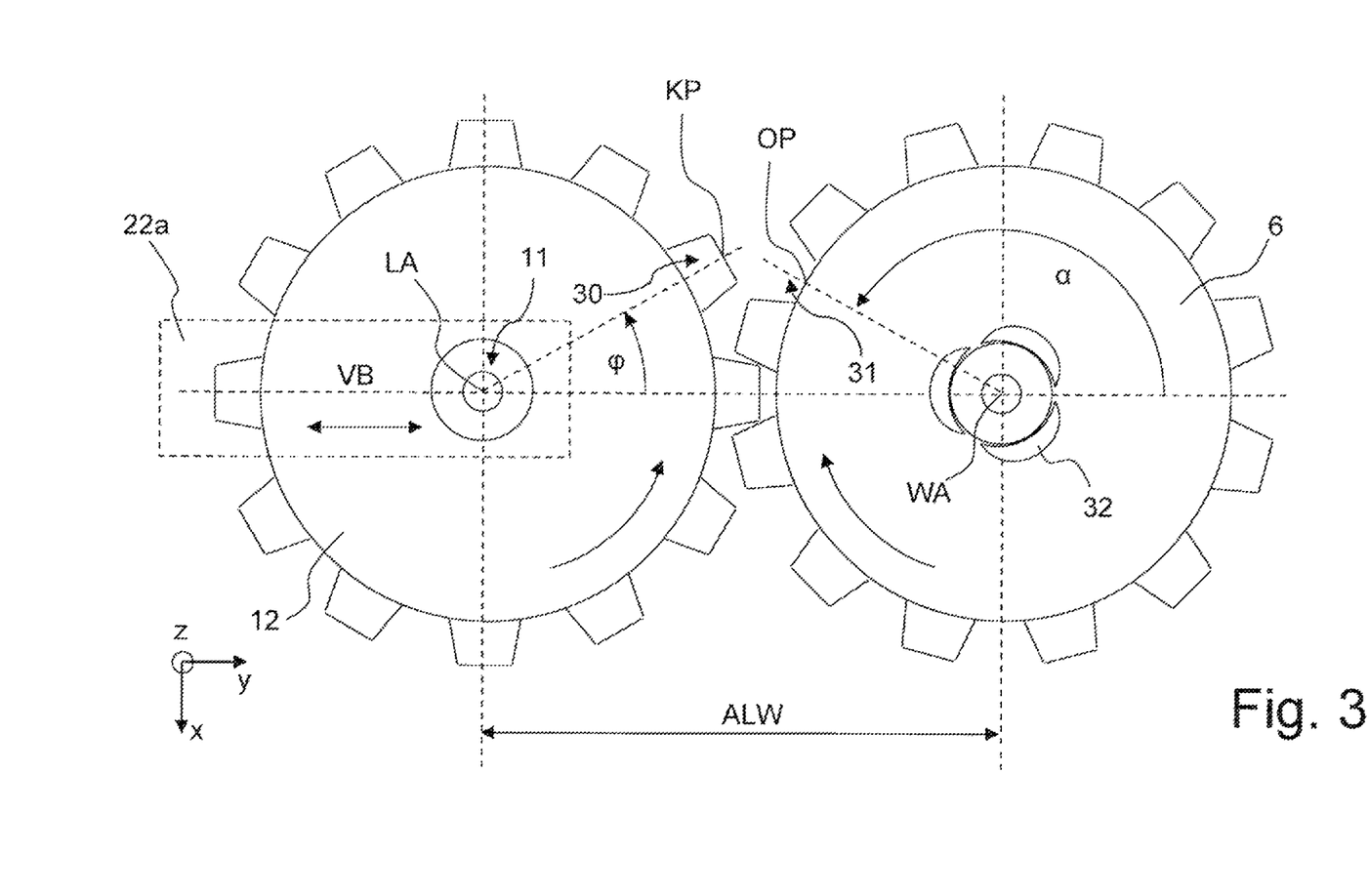
FIG. 3 is a schematic plan view of the verification station of FIG. 1 with the teaching wheel engaging in a workpiece.

FIG. 3 is a plan view of the teaching wheel 12 and the workpiece 6 in engagement during the rolling verification operation. In the example shown, the teaching wheel 12 is rotated in a counter-clockwise direction while the workpiece 6 rotates accordingly in the clockwise direction.

The rotary sensor (cf. reference numeral 16 in FIG. 1 and FIG. 2) of the teaching wheel retention member 11 has been calibrated during the fixed assembly of the teaching wheel 12 on the teaching wheel retention member 11 so that a calibration location KP which is located here at the center of a calibration tooth 30 of the teaching wheel 12 at an angular position of the rotary sensor 16 of $\phi=0$ is precisely on the connection line VB of the axes LA and WA, parallel with the positive y direction. For the sake of simplicity, the angular position $\phi$ of the rotary sensor is related below directly to the absolute angular position of this calibration location KP of the teaching wheel 12, even if the rotary sensor really determines the angular position of the teaching wheel retention member 11.

In the situation shown in FIG. 3, there is precisely one angular position of approximately $\phi=30°$, that is to say, the calibration location KP is pivoted away from the connection line VB by 30° (in a counter-clockwise direction, in a mathematically positive direction).

During the rolling verification operation, the spacing of the ALW of the teaching wheel axis LA and the workpiece axis WA (the latter is fixed) is established in the variant of the invention set out here as a function of the angular position $\phi$ during the rotation of the teaching wheel 12 (and the corresponding, coupled rotation of the workpiece 6). There should be used at least as many support locations as there are teeth on the workpiece 6 and preferably at least twice as many support locations are used as there are teeth on the workpiece 6. It should be noted that it would also be sufficient for a simple rolling verification operation to determine the maximum spacing ALW over a revolution of the teaching wheel 12.

According to the invention, a simple piece of centering information concerning the workpiece 6 is also established: an orientation location OP on the workpiece 6 which would be directly opposite the calibration location KP on the connection line VB in the angular position $\phi=0$ of the teaching wheel 12 is pivoted through an angle $\alpha=180°-\phi$ relative to the positive y direction. That orientation location OP is at the center of an orientation tooth gap 31 of the workpiece 6 (during two-flank abutment of the teaching wheel 12 and the workpiece 6 in accordance with the workpiece geometry).

Figure 5:
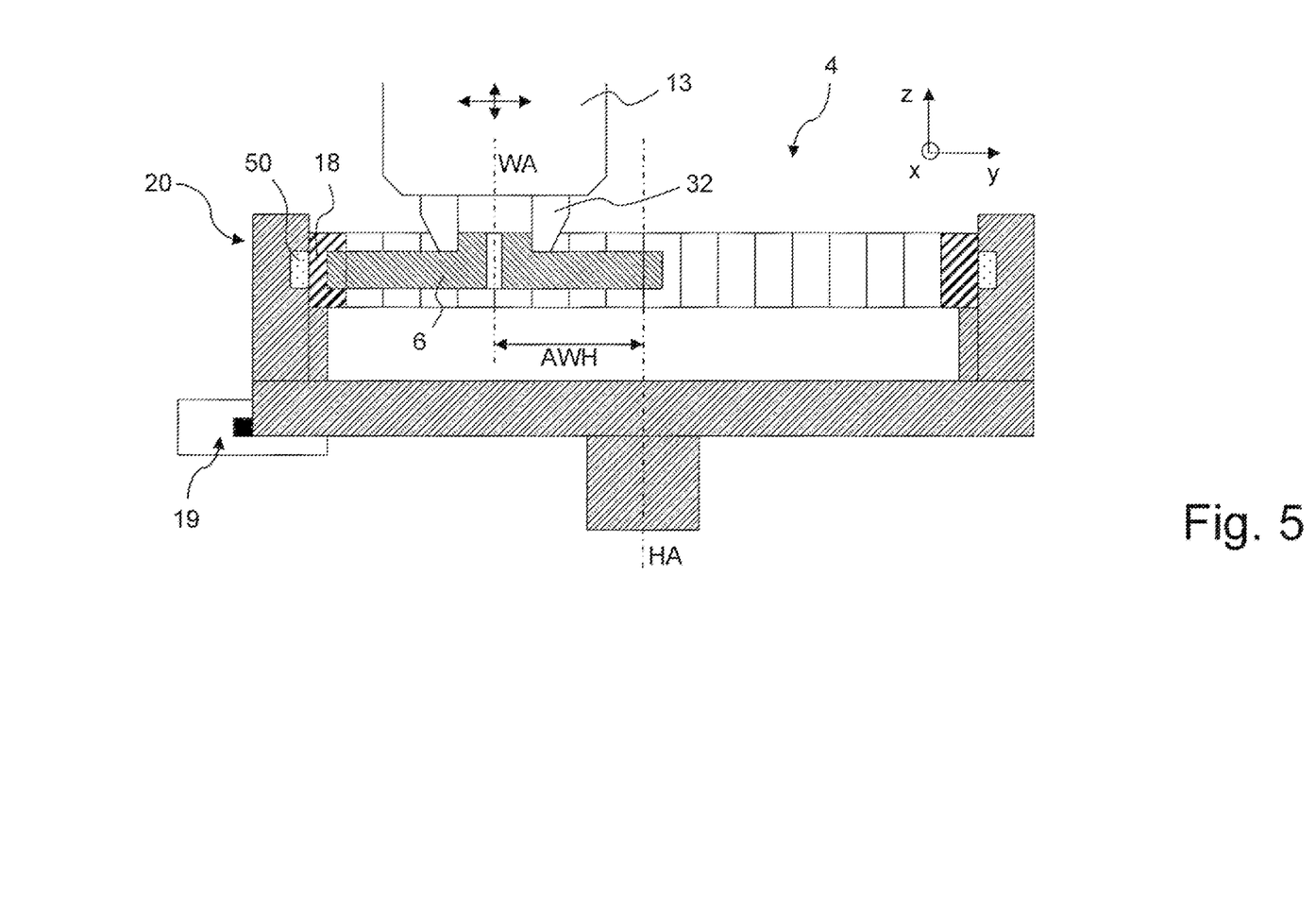
FIG. 5 is a schematic cross-section through the tool spindle of FIG. 1 in the plane V in FIG. 1 with the workpiece being advanced for the honing processing operation with the workpiece spindle.

First, the workpiece 6 is preferably gripped (after the rolling verification operation has been completed) by the workpiece spindle with gripping jaws 32 (see also FIG. 2 in this regard) and subsequently the angular position $\phi$ of the teaching wheel 12 which is still in engagement is output. Subsequently, the teaching wheel 12 can be withdrawn and the workpiece 6 can be brought to the processing station 4 with the workpiece spindle 13. During the translation movements of the workpiece spindle 13, no change in the angular position $\alpha$ of the workpiece 6 occurs (unless the workpiece spindle 13 were already caused to rotate at this time, which could be tracked with the rotary sensor 17 of the workpiece spindle 13). The workpiece 6 can also be gripped by the workpiece spindle 13, instead of at the outer side as illustrated in FIG. 3 or FIG. 5, at the inner side in the hole (cf. FIG. 2). In this instance, the receiving mandrel of the intermediate retention member 10 of the verification station 3 must move resiliently downwards.

Therefore, the angular position $\alpha$ of the orientation location OP relative to the positive y direction is known for the subsequent honing processing operation so that synchronization with the tool spindle 20 or the honing ring is possible without separate centering of the workpiece 6. In particular, all the (desired) tooth flank positions of the workpiece 6 can be derived from the position of the orientation location OP.

Figure 4A:
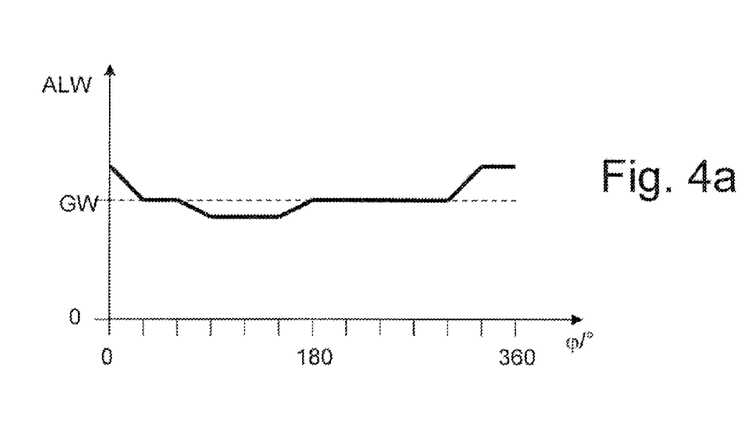
FIG. 4*a* shows an example of a measurement of the axial spacing between the teaching wheel and the workpiece with mutual engagement over a revolution of the teaching wheel.

The change of the axial spacing ALW of the teaching wheel 12 and the workpiece 6 during the rolling verification operation can be established by means of the displacement transducer 29 as a function of the rotation angle $\phi$ of the teaching wheel 12, as can be determined by the (calibrated) rotary sensor 16. FIG. 4a shows the result of such a measurement by way of example.

In the example shown, there were established at $\phi=0°$ (=360°) and $\phi=330°$ axial spacings ALW which are above a predetermined limit value GW. During the subsequent honing processing operation, the affected regions of the workpiece 6 are intended to be processed beforehand in a selective manner. The positions $\phi=0°$ and $\phi=330°$ on the teaching wheel 12 correspond to the angular positions $\alpha=180°$ and $\alpha=-150°$ (=210°) on the workpiece.

In the simplest case, the workpiece 6 (similarly to the workpiece 6 at the verification station 3 relative to the teaching wheel 12) is brought into contact with the honing tool 18 at the negative y side (cf. FIG. 5 in this regard). Identified angular positions measured in a at the workpiece 6 can thereby be attributed to the processing operation without additional calculation because the measurement location and processing location then correspond (with respect to the workpiece 6). (In the event of a different processing location, a corresponding calculation angle must be added to or subtracted from a, for instance, if a workpiece advance by the workpiece spindle 13 is possible only in the x direction but not in the y direction.)

Figure 4B:
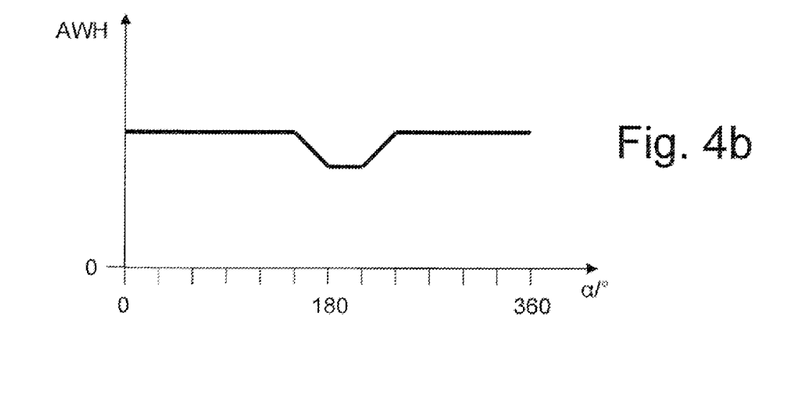

In order to remove selectively the excessively large over-dimension at $\alpha=180°$ and $\alpha=210°$, in this variant of the invention the axial spacing AWH of the workpiece spindle axis (or workpiece axis) WA and tool spindle axis (or honing tool axis) HA is reduced in a phase-precise manner if the workpiece 6 is located at the angular positions $\alpha=180°$ and $\alpha=210°$. Particularly powerful removal of material from the workpiece 6 is thereby carried out at those angular positions. At all the other angular positions, the axial spacing AWH is increased so that no material removal or only a small amount of material removal takes place at those angular positions. In other words, the axial spacing AWH is tracked (varied) during (within) a revolution of the workpiece spindle 13 by the electronic control device in accordance with the angle-dependent measurement information concerning the workpiece 6. The associated control function for the axial spacing AWH is illustrated in FIG. 4b.

After the over-dimension which is above the limit value GW has been removed from the workpiece 6 (which is assumed, for example, after a specific number of workpiece revolutions), a change is carried out in the example set out to a conventional honing processing operation, in which an axial spacing AWH which is constant during a revolution of the workpiece spindle 13 is applied.

Similarly to the axial spacing AWH, an offset of the honing tool 18 and the workpiece spindle 13 in a peripheral direction may also be applied. In other words, a tooth of the workpiece 6 is then introduced into a tooth gap of the honing tool 18 in a state slightly offset from a central position. In order to adjust an offset, that is to say, the relative rotation position of the workpiece 6 and the honing tool 18, the rotation speed of the workpiece spindle 13 and/or the tool spindle 20 can be changed, typically with short acceleration and braking impulses being applied.

FIG. 5 shows the workpiece 6, which is retained on the workpiece spindle 13 and which is rotated thereby about the workpiece spindle axis (or workpiece axis) WA (the angular position α of the workpiece 6 being changed), in engagement with the honing tool 18 which is clamped in the tool spindle 20 by means of a hydraulic expansion element 50 and is thereby rotated about the tool spindle axis (or honing tool axis) AH (whereby the angular position β of the honing tool 18 is changed). By the workpiece spindle 13 being displaced horizontally in a y direction, the axial spacing AWH can be adjusted between the axes WA and HA. In order to change the axial spacing AWH very rapidly, in particular during (within) a revolution of the workpiece 6 even at a high speed of the workpiece 6 (for instance, 5000 rpm and above), in particular piezoelectrical positioning elements may be used (not illustrated in greater detail).

Although several embodiments have been described in detail for purposes of illustration, various modifications may be made to each without departing from the scope and spirit of the invention. Accordingly, the invention is not to be limited, except as by the appended claims.

What is claimed is:

1. A method for honing a workpiece, the method comprising the steps of:
   providing a teaching wheel on a teaching wheel retention member, wherein the teaching wheel retention member is rotatable about a teaching wheel axis, and wherein a rotary sensor is configured to detect an angular position of the teaching wheel retention member;
   moving a workpiece onto an intermediate retention member, wherein the intermediate retention member is rotatable about a workpiece axis;
   bringing the workpiece into a rolling engagement with the teaching wheel, wherein the teaching wheel retention member or the intermediate retention member is rotatably driven by a first motorized drive;
   establishing an angular transfer position of the workpiece by the rotary sensor of the teaching wheel retention member;
   providing a workpiece spindle configured to retain the workpiece, wherein the workpiece spindle is rotatable about a workpiece spindle axis and rotatably driven by a second motorized drive;
   providing a honing tool on a tool spindle, wherein the tool spindle is rotatable about a spindle axis and rotatably driven by a third motorized drive;
   transferring the workpiece from the intermediate retention member onto the workpiece spindle, wherein the workpiece is retained onto the workpiece spindle;
   honing the workpiece by bringing the workpiece into a synchronized rolling engagement with the honing tool by utilizing the angular transfer position of the workpiece, thereby eliminating a separate centering step of the workpiece.

2. The method of claim 1, wherein the angular transfer position of the workpiece is established as a direct relation to the teaching wheel angular position.

3. The method of claim 2, wherein the angular transfer position of the workpiece is equal to 180 degrees minus a teaching wheel angular position.

4. The method of claim 1, wherein the step of establishing the angular transfer position of the workpiece occurs when the workpiece is still engaged with the teaching wheel while at the same time gripping the workpiece in a rotationally secure manner for the step of transferring the workpiece from the intermediate retention member onto the workpiece spindle.

5. The method of claim 1, wherein the step of transferring the workpiece from the intermediate retention member onto the workpiece spindle comprises a direct transfer absent of an intermediate step.

6. The method of claim 1, including the step of determining whether the workpiece is within a defined tolerance to determine whether the workpiece is permitted or rejected before the step of honing the workpiece.

7. The method of claim 1, wherein the angular transfer position of the workpiece is transferred to an electronic control device which controls the step of honing the workpiece by controlling the synchronization between the workpiece and the honing tool.

8. The method of claim 7, including the step of tracking the relative spacing of the workpiece on the workpiece spindle relative to the honing tool on the tooling spindle by the electronic control device during the step of honing the workpiece.

9. The method of claim 1, wherein the intermediate retention member is freely rotatable about the workpiece axis.

10. The method of claim 1, wherein after the step of honing the workpiece the method further includes the step of transferring back the workpiece from the workpiece spindle onto the intermediate retention member, and again bringing the workpiece into a rolling engagement with the teaching wheel, and then determining whether the workpiece is now within a defined honed tolerance and deciding whether the honing tool requires changing.

11. The method of claim 1, wherein the intermediate retention member or the teaching wheel retention member is rotatably disposed within a translatable carriage.

12. The method of claim 11, wherein the carriage is translatably driven by a fourth motorized drive or a linear motor.

13. The method of claim 12, wherein the translation of the carriage is tracked by means of a displacement transducer.

14. The method of claim 1, wherein the step of transferring the workpiece from the intermediate retention member onto the workpiece spindle comprises an indirect transfer by a gripping means, wherein the gripping means retains the angular transfer position of the workpiece.

15. The method of claim 1, wherein the step of bringing the workpiece into the rolling engagement with the teaching wheel further comprises the step of determining a relative axial distance of the intermediate retention member and the teaching wheel retention member.

16. The method of claim 15, wherein the step of bringing the workpiece into the rolling engagement with the teaching wheel further comprises establishing an angle dependent dimensional information concerning the workpiece, and wherein the step of honing the workpiece includes controlling a relative axial spacing and/or a relative rotational position of the workpiece spindle with respect to the honing tool in accordance with the angle dependent dimensional information concerning the workpiece.

17. The method of claim 1, wherein the teaching wheel axis and the workpiece axis are vertically oriented.

\* \* \* \* \*